3,438,448
DISC SCRAPER
Clarence B. Richey, Fresno, and Richard W. Kramer, Fowler, Calif., assignors to Massey-Ferguson Inc., Detroit, Mich.
Filed Mar. 8, 1966, Ser. No. 532,617
Int. Cl. A01b 15/16, 23/06
U.S. Cl. 172—558                    2 Claims

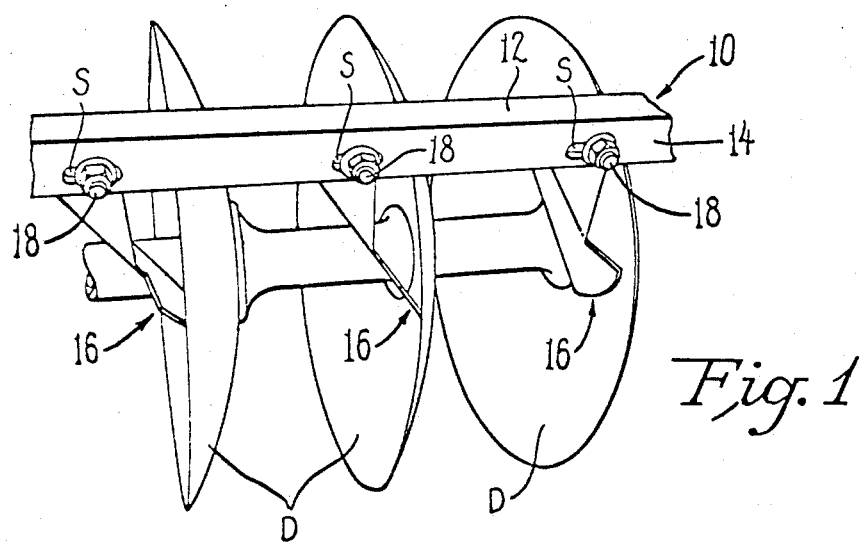
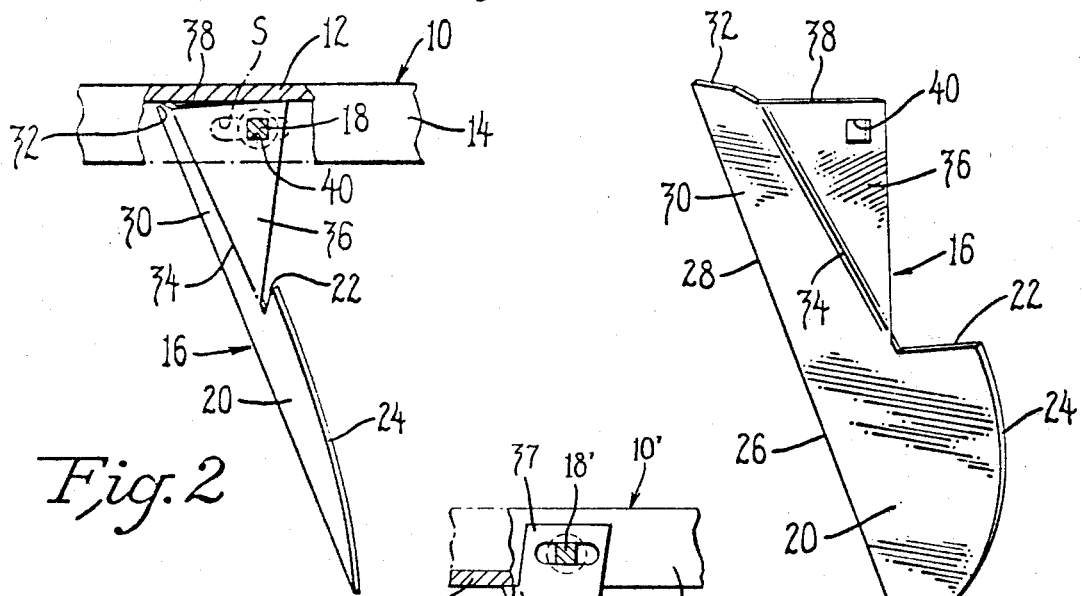
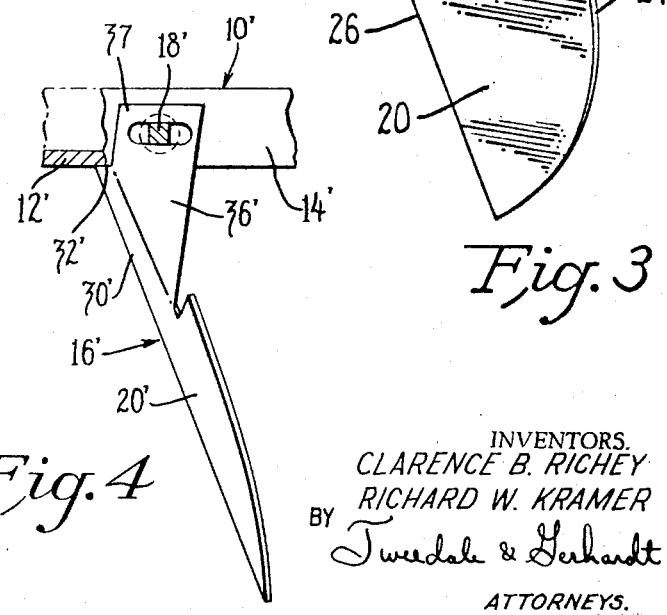

ABSTRACT OF THE DISCLOSURE

A disc harrow is provided with a scraper for each disc. The scraper includes a flat blade portion, a contiguous coplanar shank portion, and an angled mounted arm including a mounting hole for attachment of the scraper to the vertical wall of the support bar by a bolt.

---

This invention relates to scrapers for harrows and similar implements having disc tools supported thereon.

A disc scraper in accordance with the present invention includes a generally flat blade portion having a generally flat shank portion projecting from the upper edge thereof in substantially coplanar relationship therewith with a mounting arm projecting at substantially a right angle from the shank portion. A mounting hole is formed in the mounting arm at a location spaced from the shank portion such that a single bolt or pin attaches the scraper to a support having a horizontal wall and a vertical wall. The mounting hole is located such that the upper edge of the shank portion engages the top wall of the support with the blade and shank portions projecting downwardly therefrom at an acute angle toward the disc. The top edge of the shank portion reacts against the support to prevent the scraper from pivoting away from the disc.

An embodiment of the invention will be described, by way of example, in connection with the accompanying drawings in which:

FIG. 1 is a perspective view of a portion of a disc harrow having scrapers embodying the invention;

FIG. 2 is an elevational view of the scraper;

FIG. 3 is a perspective view of the scraper of FIGS. 1 and 2; and

FIG. 4 is an elevational view of an alternate construction.

In FIG. 1, reference numeral 10 designates a scraper support bar on a disc harrow or similar implement having a gang of discs D supported thereon. The scraper support member 10 has a top, horizontal wall 12 and depending vertical wall 14 on which scrapers 16 are supported by bolts or pins 18.

With reference to FIGS. 2 and 3, the scraper 16 includes a generally flat blade portion 20 having a top edge 22, a curved scraping edge 24, and a generally straight edge 26 which is co-extensive with one edge 28 of a shank portion 30 projecting upwardly from the upper edge of the blade portion. Shank portion 30 is generally flat and is substantially coplanar with respect to the blade portion 20.

The shank portion 30 has a top edge 32 and a side edge 34 opposite edge 28, and a mounting arm 36 is bent at an angle to the shank portion 30 and projects from edge 34 of the shank portion. The mounting portion 36 has a top edge 38 and is formed with a mounting hole 40 near its outer edge remote from the shank portion 30.

The single pin or bolt 18 extends through the slots S formed in the vertical wall 14 of the support bar 10 through opening 40, and the top edge 32 of the shank portion 30 reacts against the lower surface of top wall 12 to prevent the scraper 16 from pivoting in a clockwise direction about the axis of hole 40 away from the discs D. Slots S permit the scraper to be adjusted toward and away from the disc as desired. Preferably the scraper is integrally formed from a single piece of metal as indicated in FIG. 3 which results in a minimum amount of labor and material. This construction substantially reduces the cost of the scrapers and provides an inexpensive yet reliable disc scraper.

FIG. 4 shows an alternate construction of the scraper designated by reference numeral 16' which is mounted on a support 10' having a generally horizontal wall 12' and an unwardly projecting wall 14'. The shank portion 30' is notched or cut away at its upper edge such that mounting portion 36' has a portion 37 which projects upwardly beyond the top edge 32' of the shank portion. Thus, the top edge 32' reacts against the horizontal wall 12' when portion 37 is secured to the vertical wall 14' by bolt 18'.

We claim:

1. In a disc harrow having a disc supported thereon and a scraper support bar above the disc having a generally horizontal wall, a generally vertical wall, and means for mounting a scraper to the support bar vertical wall, a disc scraper comprising: a generally flat blade portion, a generally flat shank portion projecting from the upper edge of the blade portion in substantially coplanar relationship with the blade portion, a vertically extending mounting arm projecting from the shank portion and terminating adjacent the upper end of the shank portion, the arm having a mounting hole formed therein at a location spaced from the shank portion such that when secured to the vertical wall of the scraper support bar by the mounting means, the blade portion projects downwardly at an acute angle from the horizontal wall of the support bar toward the disc, with the top edge of the shank portion engaging the lower side of the horizontal wall of the support bar to prevent the scraper from pivoting about said mounting means away from the disc.

2. The construction claimed in claim 1 wherein the shank portion, blade portion and a mounting arm are integral and the mounting arm projects at an angle from one side edge of the shank portion and the common edge of the shank portion and mounting arm extends at an acute angle from the upper edge of the shank portion and mounting arm.

References Cited

UNITED STATES PATENTS

| | | | |
|---|---|---|---|
| 1,251,874 | 1/1918 | Dickinson | 172—558 |
| 1,721,876 | 7/1929 | Davis et al. | 172—558 |
| 2,901,049 | 8/1959 | De Haai | 172—558 |

ABRAHAM G. STONE, *Primary Examiner.*

RONALD C. HARRINGTON, *Assistant Examiner.*